United States Patent [19]

Kanemaki

[11] Patent Number: 4,474,386
[45] Date of Patent: Oct. 2, 1984

[54] SHOULDER PAD FOR BICYCLES

[75] Inventor: Shoji Kanemaki, Osaka, Japan

[73] Assignee: Araya Industrial Co., Ltd., Japan

[21] Appl. No.: 383,934

[22] Filed: Jun. 1, 1982

[51] Int. Cl.³ .............................................. B62J 39/00
[52] U.S. Cl. ................................... 280/289 A; 224/35
[58] Field of Search .......... 280/289 R, 289 A, 289 G, 280/289 E; 224/31 R, 35, 907, 264, 265, 261

[56] References Cited

U.S. PATENT DOCUMENTS 3,806,157  4/1974  Yarnell ........................... 280/289 G
4,129,318  12/1978  Cahill .............................. 280/289 A

FOREIGN PATENT DOCUMENTS 178482  12/1980  Japan .

OTHER PUBLICATIONS

Cycle sports vol. 12/1980 (Dec. 1, 1980 published).
Cycle sports vol. 1/1982 (Jan. 1, 1982 published).
"Motor X" Accessories by Hunt-Wilde in *American Bicyclist and Motorcyclist*, Jun. 1975.

Primary Examiner—Joseph F. Peters, Jr.
Assistant Examiner—Donn McGiehan
Attorney, Agent, or Firm—Stevens, Davis, Miller & Mosher

[57] ABSTRACT

A detachable shoulder pad for a bicycle covering a portion of the top and seat tubes of the bicycle frame comprising two identical outer sheets interconnected by a belt-like strap, a sponge sheet having recessed grooves in a longitudinal direction and having a width less than the width of the outer sheet, fixed to each outer sheet in a longitudinal direction only at central portions thereof and engageable members attached to opposite surfaces of projections of the outer sheet extending beyond the sponge sheet.

1 Claim, 3 Drawing Figures

SHOULDER PAD FOR BICYCLES

BACKGROUND OF THE INVENTION

Bicycles are not only used practically but for sports and leisure. The bicycles used for leisure are so-called off-road vehicles i.e. for cross-country events, mountain-biking or the like.

Since these bicycles are used on bad roads, steep mountain roads and the like, sport courses or running routes often include those where one cannot ride on a bicycle. Under these circumstanes, one must move along the course while carrying the bicycle on the shoulder.

In carrying the bicycle the shoulder is put into the triangle formed by three tubes, the seat tube, the top tube and the down tube. The shoulder is usually placed on the connecting portion between the top tube and the seat tube. This way of carrying the bicycle on the shoulder is found to be most reasonable for extended distances.

However, since the aforementioned tubes are normally manufactured from relatively small steel pipes, the tubes dig into the shoulder, creating considerable pain if the bicycle is carried for any extended distance.

It is an object of the present invention to spread the load on the shoulder over a greater area thus lessening the pain.

In order to solve the above-described problem, the present invention provides interconnected pads in the neighborhood of the connecting portion between the top tube and the seat tube. Thus both tubes are covered with pads having a cushion material.

In accordance with the aforementioned technical means, when the bicycle is carried on the shoulder, the pads have a cushioning effect thereby relieving the pain.

Since one pad covers the upper end of the seat tube, the other pad covers one side of the top tube and both are connected to each other by the connecting means, these pads are not disengaged from each other due to the vibrations or the like even if the bicycle is allowed to run while these pads are in place.

BRIEF SUMMARY OF THE INVENTION

This invention relates to a shoulder pad which comprises two pads for covering a top tube and a seat tube of a bicycle in the neighborhood of a connecting portion therebetween.

The shoulder pad of the present invention may be attached to the bicycle to thereby ease pain to the shoulder when the bicycle is carried on the shoulder.

BRIEF DESCRIPTION OF THE SEVERAL VIEWS OF THE DRAWINGS

The present invention will be made more clear by reference to the accompanying drawings in which.

DETAILED DESCRIPTION OF THE PREFERRED EMBODIMENT

Figure 1:
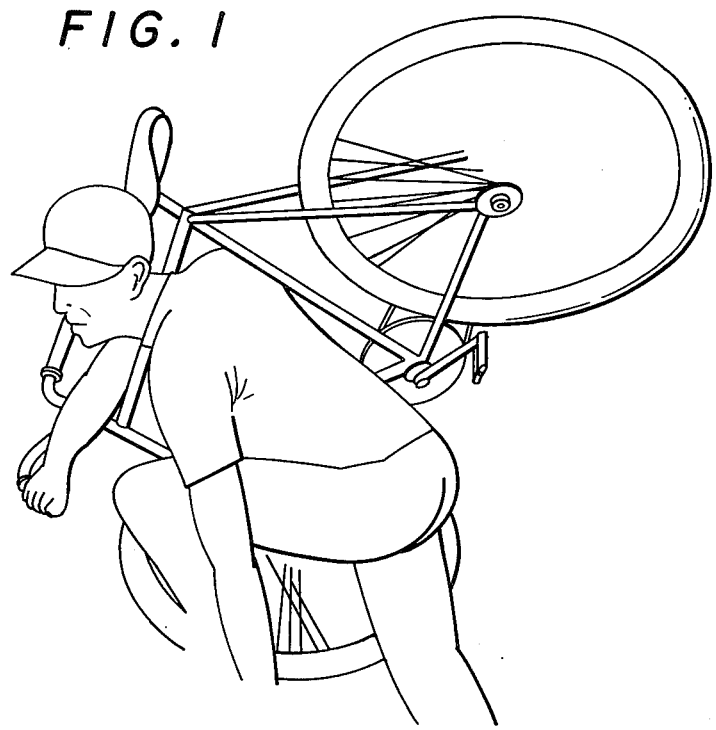
FIG. 1 is a view for explanation of the state in which the bicycle is carried on the shoulder.
Figure 2:
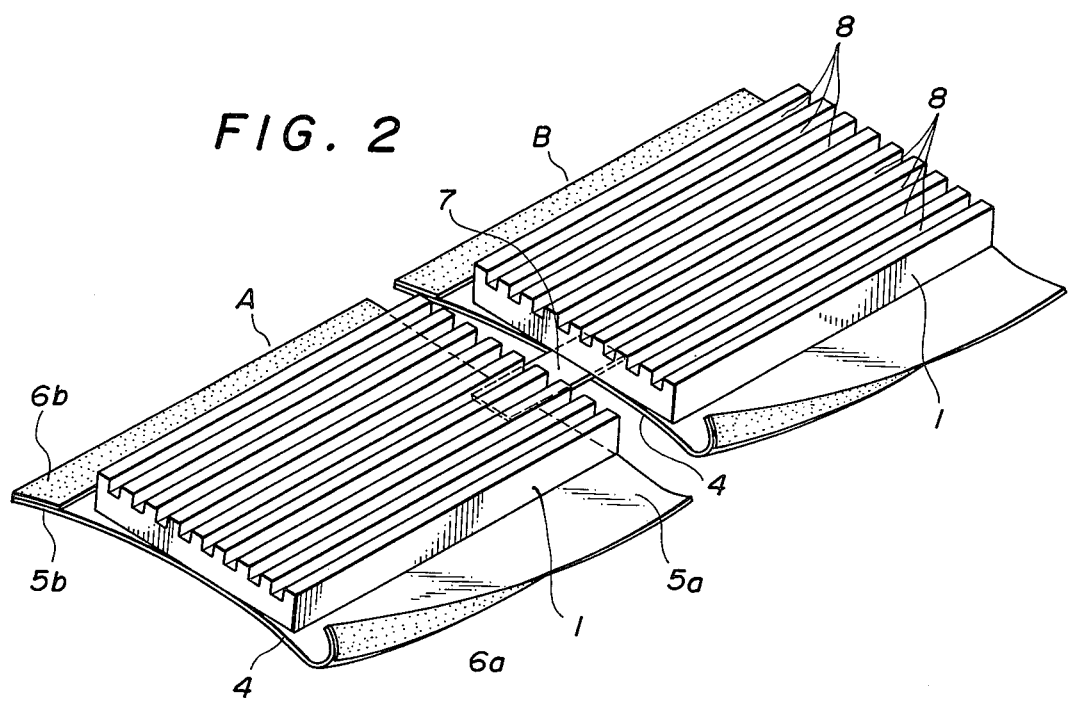
FIG. 2 is a perspective view as viewed from the back side of an embodiment in accordance with the present invention.

In the embodiment shown in FIG. 2, two pads (A) and (B) of the same construction, comprise a sponge sheet (1) used as a cushion material, said sponge sheet having a width capable of being wound about the outer periphery of one of the tubes of the bicycle frame, an outer sheet (4) attached to the outside of the sponge sheet, said outer sheet having a width which is greater than that of the sponge sheet 1, and plane fasteners (6a) and (6b) attached on projected portions (5a) and (5b), respectively, of the outer sheet. The aforesaid outer sheets are connected by a belt-like strap.

One of said plane fasteners is attached to one side of one projected portion (5a) of the outer sheet (4) whereas the other plane fastener (6b) is attached to the opposite side of the other projected portion (5b) so that when the sponge sheets are wound about the tubes, said projected portions (5a) and (5b) are superimposed one another and the plane fasteners (6a) and (6b) are opposed to each other.

Figure 3:
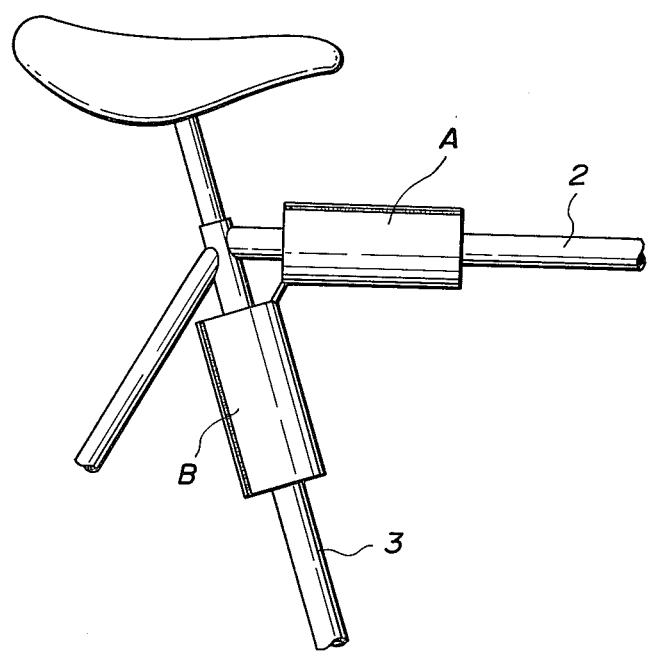
FIG. 3 is a view for explaining how to attach pads to the bicycle.

In the above-described embodiment, when one pad (A) is wound about one side of the top tube (2) and the other pad (B) wound about the upper end of the seat tube (3) in a manner as described hereinbefore to engage the plane fasteners (6a) and (6b), these pads cover both tubes in the neighborhood of their connection and become locked in a connecting state, as shown in FIG. 3.

With this padding, the shoulder when the bicycle is carried is well protected.

In addition, in the case of the above-described embodiment of the present invention, each of the pads may be detachable from each corresponding tube and a detachable engaging member is used as a means for winding and locking a pad onto a tube. Thus the pads may be conveniently removed and attached as needed.

While in the above-described embodiment, the plane fasteners having been used as members for engaging the projected portions (5a) and (5b), may be replaced by detachable engaging members such as hooks, in which case, the effect of the present invention remains unchanged.

Furthermore, in the illustrated embodiment, the sponge sheet (1) and the outer sheet (4) are fixed to each other in a longitudinal direction only at their central portions, so that when the pad is wound about the tube, no shearing force in a circumferential direction acts on the joined portion between the sponge sheet and the outer sheet. Thus even if the pads are attached and removed repeatedly, said portions will not be damaged.

Moreover, since the sponge sheet (1) in the illustrated embodiment is designed with a number of recessed grooves (8), (8) aligned lengthwise in the internal surface thereof, the sponge sheet tends to flex when it is wound about the top tube and the seat tube, thus facilitating attachment of the pads. Also, in this case, the peripheral tension is maintained so that if the vibration or shock is applied to the pads (A) and (B), these pads will not disengage.

I claim:

1. A detachable shoulder pad for a bicycle covering a portion of the top and seat tubes of the bicycle frame comprising two identical outer sheets interconnected by a belt-like strap, a sponge sheet having recessed grooves in a longitudinal direction and having a width less than the width of said outer sheet, fixed to each outer sheet in a longitudinal direction only at central portions thereof and engagable members attached to opposite surfaces of projections of the outer sheet extending beyond the sponge sheet.

* * * * *